UNITED STATES PATENT OFFICE.

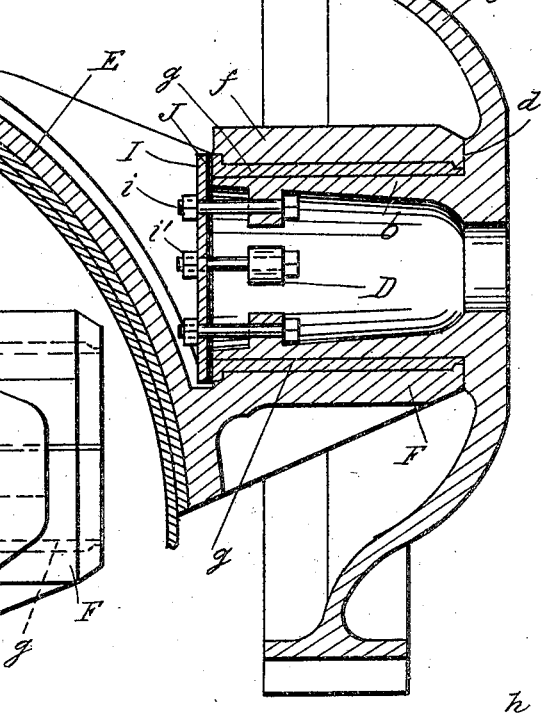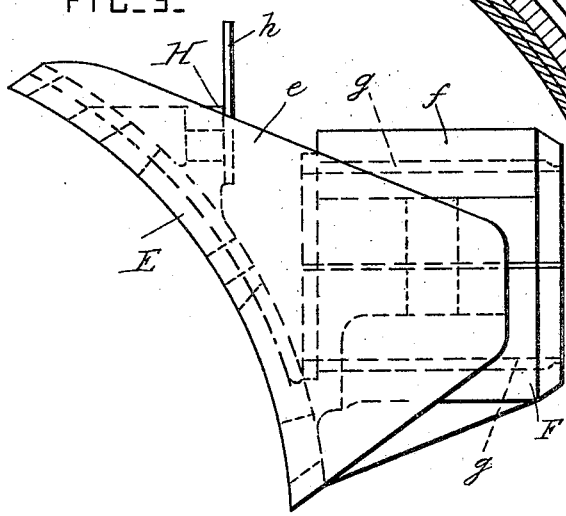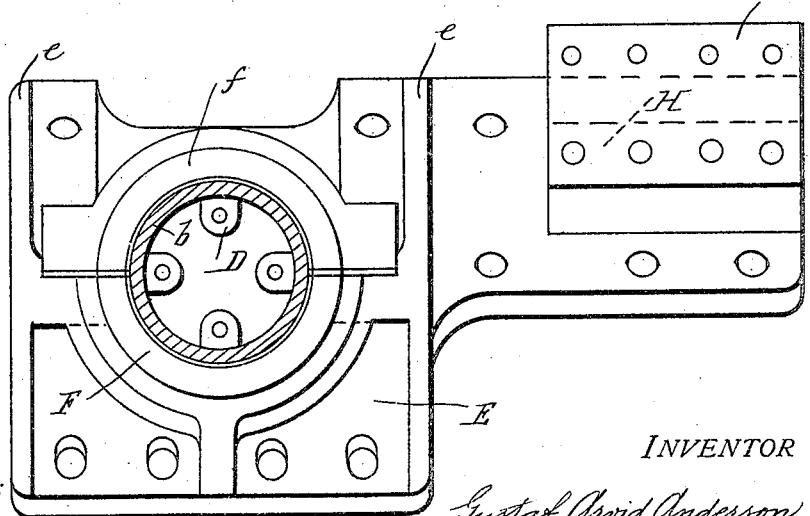

GUSTAF ARVID ANDERSON, OF WAYNESBORO, PENNSYLVANIA, ASSIGNOR TO THE GEISER MANUFACTURING COMPANY, OF WAYNESBORO, PENNSYLVANIA.

WHEEL-BEARING.

No. 818,218.　　　Specification of Letters Patent.　　　Patented April 17, 1906.

Application filed November 18, 1905. Serial No. 288,084.

*To all whom it may concern:*

Be it known that I, GUSTAF ARVID ANDERSON, a citizen of the United States, residing at Waynesboro, in the county of Franklin and State of Pennsylvania, have invented certain new and useful Improvements in Wheel-Bearings; and I do hereby declare the following to be a full, clear, and exact description of the invention, such as will enable others skilled in the art to which it appertains to make and use the same.

This invention relates to the bearings for supporting the intermediate toothed gear-wheels of traction-engines; and it consists in the novel construction and combination of the parts, hereinafter fully described and claimed.

In the drawings, Figure 1 is a cross-section through the toothed wheel and its bearing. Fig. 2 is a front view of the bearing, showing the hub of the wheel in section. Fig. 3 is an end view of the bearing.

A is a portion of the boiler of a traction-engine of any approved construction. The steam-engine is secured to the top of the boiler and has a toothed pinion upon its crank-shaft, which engages with the intermediate toothed wheel B. This intermediate toothed wheel B is also supported from the boiler, and it is desirable that it should be supported in a manner which will permit it to be removed with facility and so that its bearing may be repaired when it becomes worn.

The wheel B is provided with a tubular hub $b$, which is connected with the rim of the wheel by means of a curved plate or arms $c$, so that the tubular bearing is arranged inside the rim of the wheel. In this manner a very long bearing having a large wearing-surface is provided. The hub $b$ has a shoulder $d$ at its outer end.

D represents lugs which project within the tubular bearing and which are provided with bolt-holes.

E is a curved supporting-bracket which is bolted against the boiler in any approved manner. This bracket has two strengthening-ribs $e$ at its upper part, and F is a bearing for the wheel-hub, which projects from the bracket between its said ribs and which is supported by them. This bearing is provided with a removable cap $f$, like that of a shaft-bearing, and the bearing and cap are provided with liners $g$ of Babbitt metal. At one end portion of the supporting-bracket, to one side of the bearing and its supporting-ribs, a lug H is provided, and $h$ is a spring-steel plate which is secured to this lug. The crank-shaft bearing of the engine is supported by this spring-steel plate, which is arranged crosswise of the bearing, so that the crank-shaft is kept at the same distance from the bearing of the intermediate wheel.

I is a plate or ring which is secured to the inner end of the wheel-hub by means of bolts $i$, which engage with the lugs inside the tubular hub. This disk or plate bears against the end of the Babbitt metal, which projects a little at the inner end of the bearing, and it prevents the tubular hub from sliding outwardly in its bearing. The shoulder at the other end of the tubular hub bears against the front or outer end of the bearing. J represents washer-adjusting rings between the plate I and the inner end of the bearing; but these thin adjusting-rings may be dispensed with, if desired. The nuts $i'$ of the bolts $i$ are arranged in the space between the ribs $e$ and between the bearing and the curved bracket, and when they are removed the wheel-hub can be slid out of the bearing.

The Babbitt metal of the bearing can be renewed as often as it becomes worn. The wheel-hub does not become worn away, because of its very large bearing-surface.

What I claim is—

1. The combination, with a supporting-bracket provided with a bearing, of a wheel provided with a tubular hub which is journaled in the said bearing and provided with a shoulder bearing against the outer end of the said bearing, a plate bearing against the inner end of the said bearing, bolts connected to the internal part of the said tubular hub and projecting through openings in the said plate, and nuts screwed on the projecting end portions of the said bolts and retaining the said hub in position.

2. The combination, with a supporting-bracket provided with a bearing, of a wheel provided with a tubular hub which is arranged inside its rim and which is journaled in the said bearing, said tubular hub having internally-projecting lugs and a shoulder at the outer end of the bearing, a plate which bears against the inner end of the said bearing, and bolts connecting the said plate with the said lugs.

3. The combination, with a curved supporting-bracket having a bearing projecting from its lower part and having also integrally-formed ribs connecting the end portions of the said bearing with the upper end portions of the bracket, and a removable cap secured to the said bearing; of a wheel provided with a tubular hub journaled in the said bearing and having a shoulder which bears against the outer end of it, a plate bearing against the inner end of the said bearing, and fastening devices between the said plate and hub.

In testimony whereof I have affixed my signature in the presence of two witnesses.

GUSTAF ARVID ANDERSON.

Witnesses:
 WM. G. EPPLEY,
 DANIEL S. BEARD.